US012363367B2

(12) United States Patent
Ravuru et al.

(10) Patent No.: US 12,363,367 B2
(45) Date of Patent: Jul. 15, 2025

(54) TAILORING AND CENSORING CONTENT BASED ON A DETECTED AUDIENCE

(71) Applicant: ROKU, INC., San Jose, CA (US)

(72) Inventors: Rakesh Ravuru, San Jose, CA (US); Bao Nguyen, San Jose, CA (US); Behnam Asefisaray, San Jose, CA (US); Doo Soon Kim, San Jose, CA (US); Praful Mangalath, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/937,501

(22) Filed: Oct. 3, 2022

(65) Prior Publication Data

US 2024/0114191 A1    Apr. 4, 2024

(51) Int. Cl.
| | |
|---|---|
| *H04N 21/266* | (2011.01) |
| *G06V 10/764* | (2022.01) |
| *G10L 15/18* | (2013.01) |
| *G10L 15/22* | (2006.01) |
| *H04N 21/258* | (2011.01) |

(Continued)

(52) U.S. Cl.
CPC ......... *H04N 21/266* (2013.01); *G06V 10/764* (2022.01); *G10L 15/1815* (2013.01); *G10L 15/22* (2013.01); *H04N 21/25866* (2013.01); *H04N 21/42203* (2013.01); *H04N 21/8106* (2013.01)

(58) Field of Classification Search
None
See application file for complete search history.

(56) References Cited

U.S. PATENT DOCUMENTS

| | | | | |
|---|---|---|---|---|
| 11,368,751 | B1 * | 6/2022 | Dhiman | H04N 21/4415 |
| 2020/0145723 | A1 * | 5/2020 | Vaughn | H04N 21/25883 |
| 2022/0277738 | A1 * | 9/2022 | Aher | G06F 16/9035 |

(Continued)

FOREIGN PATENT DOCUMENTS

EP    3896985 A1 * 10/2021    ............. G06F 3/167

OTHER PUBLICATIONS

Desplanques, B. et al., "ECAPA-TDNN: Emphasized Channel Attention, Propagation and Aggregation in TDNN Based Speaker Verification," arXiv:2005.07143vs [eess.AS], downloaded from https://arxiv.org/abs/2005_07143, 5 pages, Aug. 10, 2020.

(Continued)

*Primary Examiner* — Omar S Parra
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for tailoring and censoring content based on audience detected. An example embodiment operates by detecting an audience within a vicinity of a media device based on identifying information received by the media device, determining a category of the audience with a user identification system based on the identifying information, identifying a content tailoring rule for the audience based on the category of the audience, retrieving a content to be played by the media device, and modifying the content based on the content tailoring rule and a category label of the content.

20 Claims, 10 Drawing Sheets

(51) Int. Cl.
*H04N 21/422* (2011.01)
*H04N 21/81* (2011.01)

(56) References Cited

U.S. PATENT DOCUMENTS

2023/0087963 A1* 3/2023 Doken ............. H04N 21/43615
　　　　　　　　　　　　　　　　　　　　　725/12
2023/0263428 A1* 8/2023 Hull ..................... A61B 5/6828
　　　　　　　　　　　　　　　　　　　　　73/865.4

OTHER PUBLICATIONS

"Speechbrain," printed from https://github.com/speechbrain/tree/develop/recipes/VoxCeleb/SpeakerRec, as archived Sep. 6, 2021 at web.archive.org, 4 pages.
Thienpondt, J. et al., "The IDLAB VoxCeleb Speaker Recognition Challenge 2021 System Description," arXiv:2109.04070v1 [eess.AS], downloaded from https://arxiv.org/abs/2109.04070, 4 pages, Sep. 9, 2021.

* cited by examiner

TAILORING AND CENSORING CONTENT BASED ON A DETECTED AUDIENCE

BACKGROUND

Field

This disclosure is generally directed to tailoring and censoring content based on a detected audience in proximity to a media device, and more particularly to tailoring and censoring the content to be played on the media device according to a content tailoring rule for the detected audience and a category label of the content.

Background

Television (TV) offers viewers access to content via subscription to cable or satellite services or through over-the-air broadcasts. In general, content, such as multimedia content, can be delivered from a content source device operated by a content provider to millions of viewers. The content can have different categories or ratings for appropriate audiences. For example, the ratings of content can include general audience (G), parental guidance suggested (PG), parents strongly cautioned (PG-13), restricted (R), and adults only (NC-17). The PG-13, R, and NC-17 rated content can include material not appropriate for children.

Parents/adults can restrict inappropriate content from children by not selecting content to be displayed. However, some inappropriate content (e.g., inappropriate advertisements, inappropriate scenes in a movie) may be played while the parents and the children are watching TV or a movie together. The parents may not be able to skip or restrict the inappropriate content in time. Additionally, the children may come within the vicinity of the TV while the parents are watching TV. The parents may not be able to tailor the content in time to play appropriate content for the children.

SUMMARY

Provided herein are system, apparatus, article of manufacture, method and/or computer program product embodiments, and/or combinations and sub-combinations thereof, for tailoring and censoring content based on a detected audience. In some embodiments, an audience may comprise one or more users within a vicinity of a media device and the identities of the one or more users can be detected with one or more sensing modules. The one or more sensing modules can continuously or periodically monitor the vicinity of the media device to detect any users within the audience. The one or more sensing modules can include one or more images sensing modules to capture one or more images of the audiences and/or audio sensing modules to capture one or more utterances of the users in an audience. The captured images and/or utterances of the users can act as identifying information to detect and identify the users in the audience.

In some embodiments, based on the captured images and/or utterances, a user identification system can identify the detected users and determine categories of the detected users. The categories can include children, parents, adults, a member or household, guests, etc. A content tailoring system can identify one or more content tailoring rules based on the determined categories. In some embodiments, the content tailoring system can perform a union, intersection, or other combination or delineation of the content tailoring rules to update the content tailoring rules. In some embodiments, each of the determined categories can have a priority and the content tailoring system can identify a content tailoring rule for the category having the highest priority.

In some embodiments, the media device can retrieve upcoming frames and scenes of content currently playing on a display device connected to the media device. The retrieved content can include category labels for frames and scenes of the content. The category labels can indicate inappropriateness for various categories of audiences. Based on the identified content tailoring rules and categories labels of the content, the content tailoring system can tailor and censor the content to skip inappropriate frames and/or scenes of the content for the detected users.

An example embodiment of a system can include a storage module and at least one processor each coupled to the storage module and configured to perform various operations to tailor and censor content based on the detected audience. In an example, the at least one processor can be configured to detect an audience within a vicinity of a media device based on identifying information received by the media device. Afterwards, the at least one processor can be configured to determine a category of users within the audience with a user identification system based on the identifying information. In addition, the at least one processor can be configured to identify a content tailoring rule for one or more users in the audience based on the category of the one or more users. In addition, the at least one processor can be configured to retrieve a content to be played by the media device. The at least one processor can be further configured to modify the content based on the content tailoring rule and a category label of the content and provide the modified content to be played by the media device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
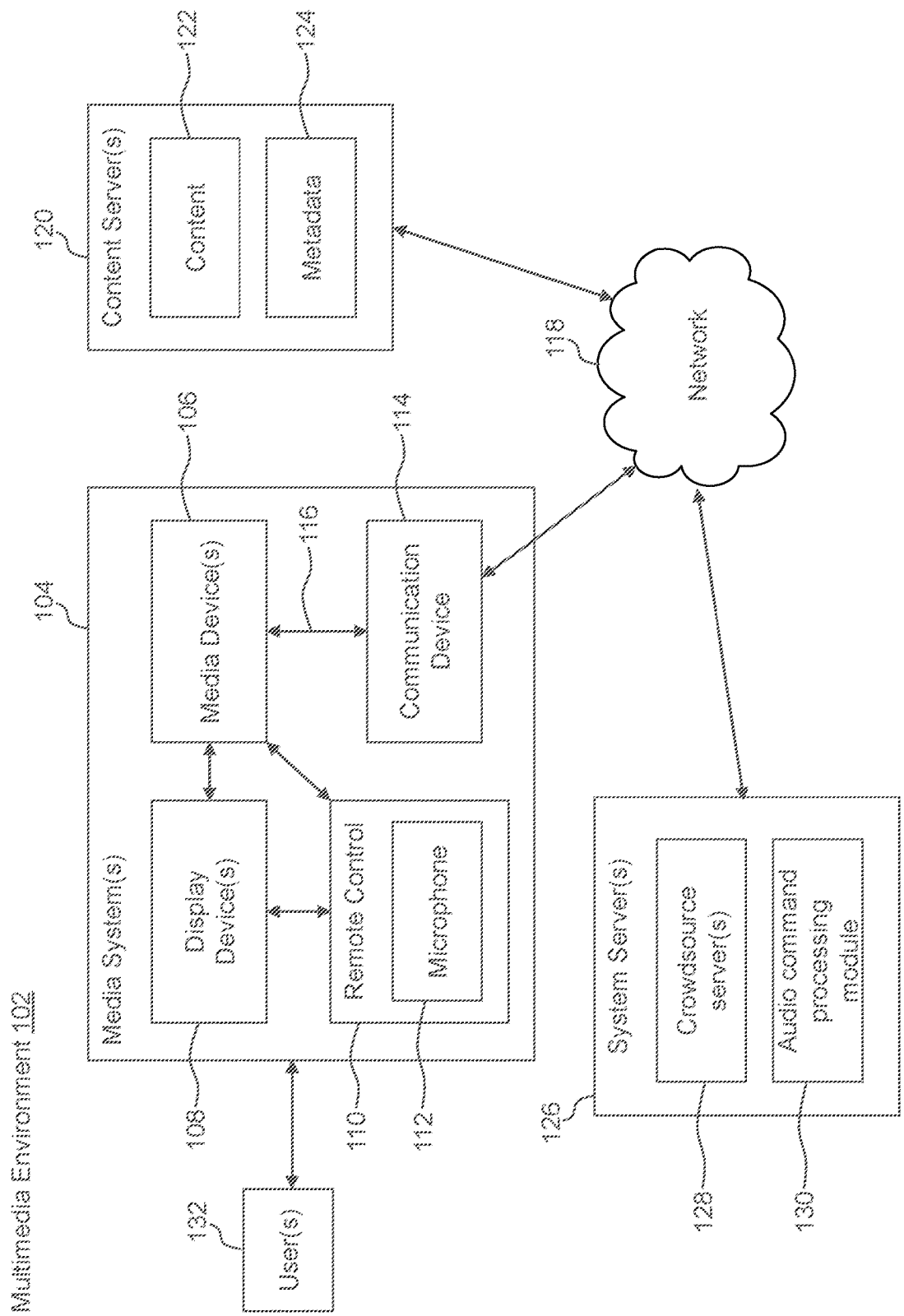
FIG. 1 illustrates a block diagram of a multimedia environment, according to some embodiments.

With the technology advances for multimedia and communication, many types of media content are readily available for streaming and/or display. For example, media content can be delivered via various communication technologies so that the media content can be easily accessed, watched, or listened to anywhere and anytime by both children and adults. Compared to the early days when media content may be limited to printed publications or delivered by radio, current media content can be available in various forms such as videos, movies, advertisement, audio files, text, etc., and any combination thereof. In general, media content may be referred to as content, which may include one or more content items, where one content item can include a plurality of scenes and each scene can include a sequence of frames. How to efficiently and accurately deliver appropriate content to interested viewers, users, or audiences, can be of value to those parties as well as the content creators. Viewers and users (and similar parties and entities) are used interchangeably in the current description.

Traditionally, content can be rated with different categories for appropriate audiences, such as G, PG, PG-13, R, and NC-17. For example, the content rated PG may have some material inappropriate for children, the content rated PG-13 may have some material inappropriate for children under thirteen, the content rated R requires parent or adult guardian, and the content rated NC-17 is not appropriate for children seventeen and under. The inappropriate content can include violence, nudity, inappropriate language, and other inappropriate materials.

Parents/adults can restrict inappropriate content from the children through parental control of the content which may, for example, prevent content from being displayed. However, parents may not know the details of every content in advance. Inappropriate content (e.g., inappropriate advertisements, inappropriate scenes in a movie) for children may be played while the parents and the children are watching together. The parents may not be able to skip or restrict the inappropriate content in time. Additionally, when the parents are watching TV, the children may join and come within the vicinity of the TV. The parents may not be able to tailor the current and upcoming content in time to have appropriate content for the children. Moreover, when the parents and the children are watching TV together, the parents may leave for a short period of time. The content may not be tailored accordingly and inappropriate content may play during that time. Furthermore, when the parents search for content with the children present, inappropriate content for children may be recommended to the parents and seen by the children.

Provided herein are system, apparatus, device, method and/or computer program product embodiments, and/or combinations and sub-combinations thereof, for tailoring and censoring content based on a detected audience to dynamically modify and present appropriate content to the audience. In some embodiments, one or more users in the audience within a spatial vicinity of a media device can be detected by a sensor. The spatial vicinity can be a spatial limit, such as fifteen feet from the media device or outside the room of the media device. The sensor can detect one or more users and capture identifying information of the one or more users. The identifying information can include an image or an utterance of the one or more users. Based on the identifying information, a category for each of the one or more users can be determined. The category can include adults, men, women, children under seventeen, children under thirteen, toddlers, a member of household, guests, and other categories. A content tailoring rule for the one or more audiences can be identified based on the category to tailor current viewing content and upcoming content. Hence, the content viewed by the one or more users can be tailored and censored. Inappropriate content for the one or more users (e.g., children) can be skipped or modified based on the content tailoring rule. Additionally, when the one or more users search for content, inappropriate content for any of the one or more users may not be recommended.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102 including a content tailoring system tailoring and censoring content based on a detected audience, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content, such as content 122.

Each media system 104 may include one or more media device(s) 106 each coupled to one or more display device(s) 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, a streaming set-top box (STB), cable and satellite STB, a DVD or BLU-RAY device, an audio/video playback device, a cable box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content server(s) 120 (also called content providers, channels, or sources). Although only one content server 120 is shown in FIG. 1, in practice the multimedia environment 102 may include any number of content server(s) 120. Each content server 120 may be configured to communicate with network 118. Each content server 120 may be configured to communicate with network 118. Content server 120, media device 106, display device 108, may be collectively referred to as a media system, which may be an extension of media system 104. In some embodiments, a media system may include system server 126 as well.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form. Content 122 may be the source displayed on display device 108.

In some embodiments, metadata 124 comprises data about content 122. For example, metadata 124 may include associated or ancillary information indicating or related to labels of the materials in the content 122, writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index. In some embodiments, content 122 can include a plurality of content items, and each content item can include a plurality of frames having metadata about the corresponding frame (see FIG. 3).

The multimedia environment 102 may include one or more system server(s) 126. The system server(s) 126 may operate to support the media device(s) 106 from the cloud.

It is noted that the structural and functional aspects of the system server(s) 126 may wholly or partially exist in the same or different ones of the system server(s) 126. System server(s) 126 and content server 120 together may be referred to as a media server system. An overall media system may include a media server system and media system 104. In some embodiments, a media system may refer to the overall media system including the media server system and media system 104.

The media device(s) 106 may exist in thousands or millions of media systems 104. Accordingly, the media device(s) 106 may lend themselves to crowdsourcing embodiments and, thus, the system server(s) 126 may include one or more crowdsource servers 128.

For example, using information received from the media device(s) 106 in the thousands and millions of media systems 104, the crowdsource server(s) 128 may identify similarities and overlaps between closed captioning requests issued by different user(s) 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming of the movie. In some embodiments, crowdsource server(s) 128 can be located at content server 120. In some embodiments, some part of content server 120 functions can be implemented by system server 126 as well.

The system server(s) 126 may also include an audio command processing module 130. As noted above, the remote control 110 may include a microphone 112. The microphone 112 may receive audio data from user(s) 132 (as well as other sources, such as the display device 108). In some embodiments, the media device 106 may be audio responsive, and the audio data may represent verbal commands from the user(s) 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system server(s) 126. The audio command processing module 130 may operate to process and analyze the received audio data to recognize the user(s) 132's verbal command. The audio command processing module 130 may then forward the verbal command back to the media device 106 for processing.

Figure 2:
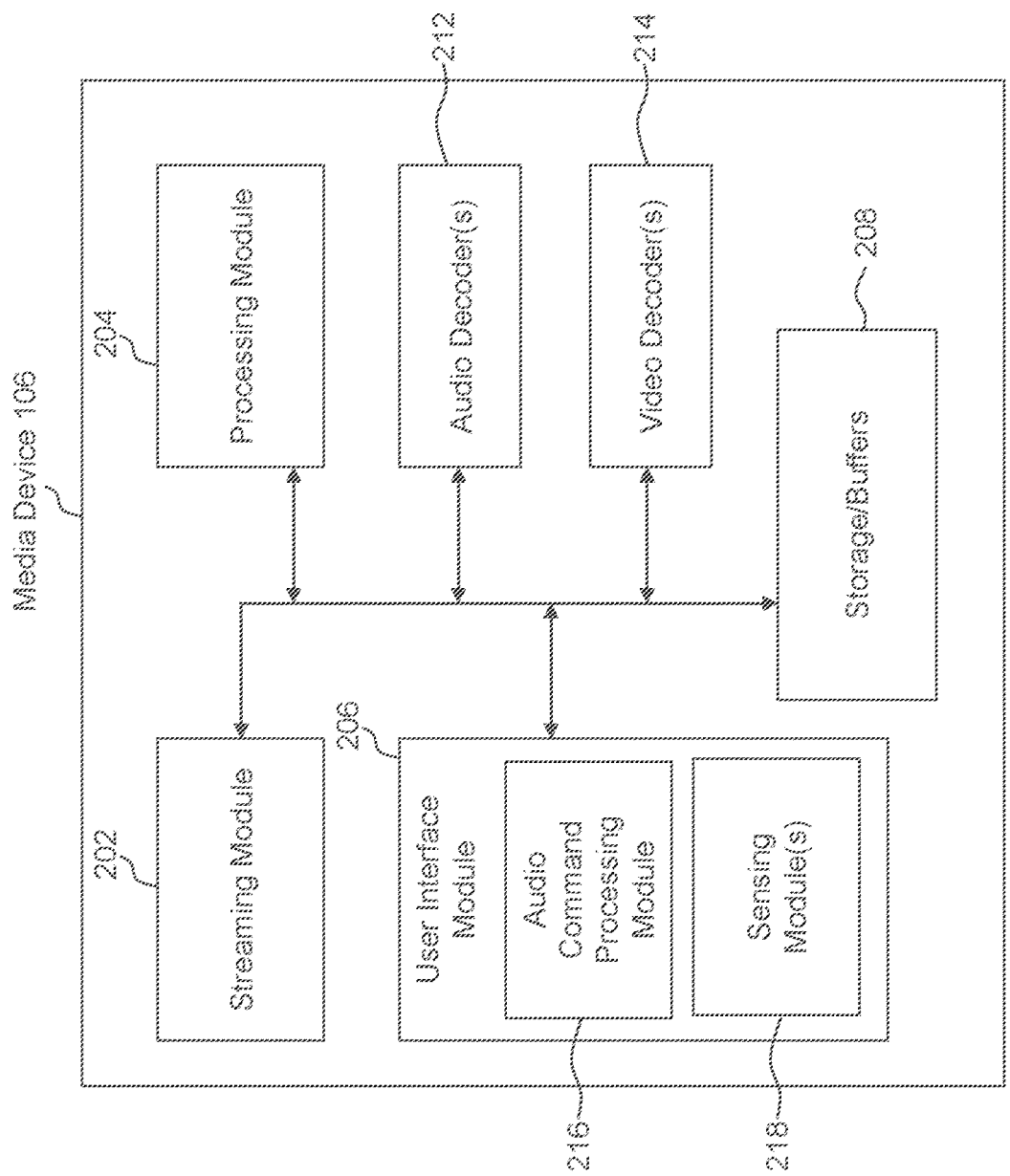
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system server(s) 126 may then cooperate to pick one of the verbal commands to process (either the verbal command recognized by the audio command processing module 130 in the system server(s) 126, or the verbal command recognized by the audio command processing module 216 in the media device 106).

FIG. 2 illustrates a block diagram of an example media device(s) 106, according to some embodiments. Media device(s) 106 may include a streaming module 202, processing module 204, storage/buffers 208, and user interface module 206. As described above, user interface module 206 may include audio command processing module 216.

Figure 5:
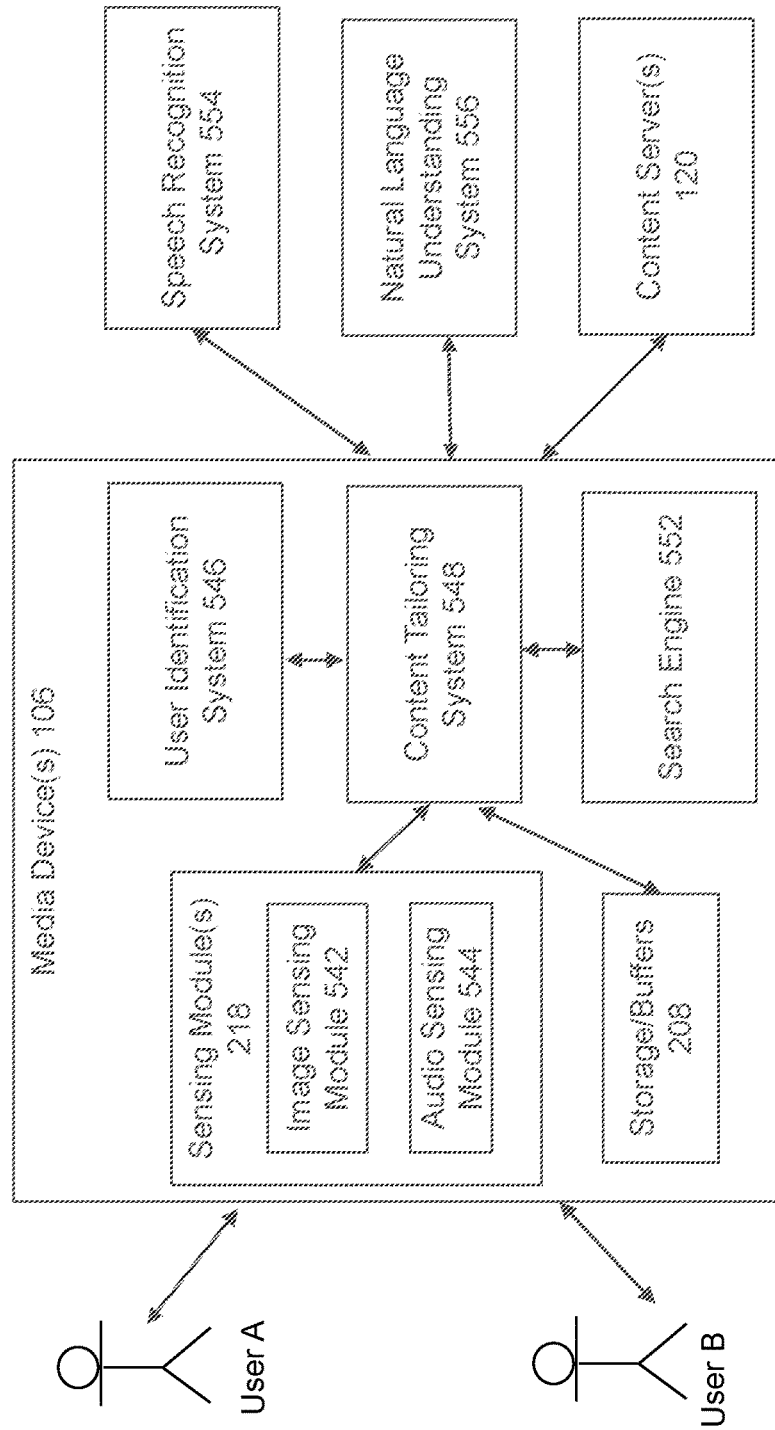
FIG. 5 illustrates a block diagram of a system for audience identification and content tailoring for the detected audience, according to some embodiments.

In some embodiments, user interface module 206 may further include one or more sensing module(s) 218, such as image sensing module 542 and audio sensing module 544 (see FIG. 5). Sensing module(s) 218 can include cameras, microphones, infra-red sensors, and touch sensors, to name just some examples. Sensing module(s) 218 can capture sensing signals when user(s) 132 enter within a vicinity of sensing module(s) 218. The sensing signals can include image signals, audio signals, infrared signals, and touching signals, to name just some examples. In some embodiments, sensing module(s) 218 can be integrated into media device(s) 106. In some embodiments, sensing module(s) 218 can be integrated to display device(s) 108, remote control 110, or any devices used by user(s) 132 to interact with media systems 104. In some embodiments, sensing module(s) 218 can be stand-alone modules outside of media device(s) 106, display device(s) 108, remote control 110, and devices used by user(s) 132. Implemented as a stand-alone device, sensing module(s) 218 may be physically located within the vicinity of media device(s) 106 to detect audiences. Media device(s) 106 can receive the sensing signals captured by sensing module(s) 218 and identify one or more user(s) 132 in an audience within the vicinity of media device(s) 106 based on identifying information in the captured sensing signals.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user(s) 132 may interact with the media device(s) 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

Figure 3:
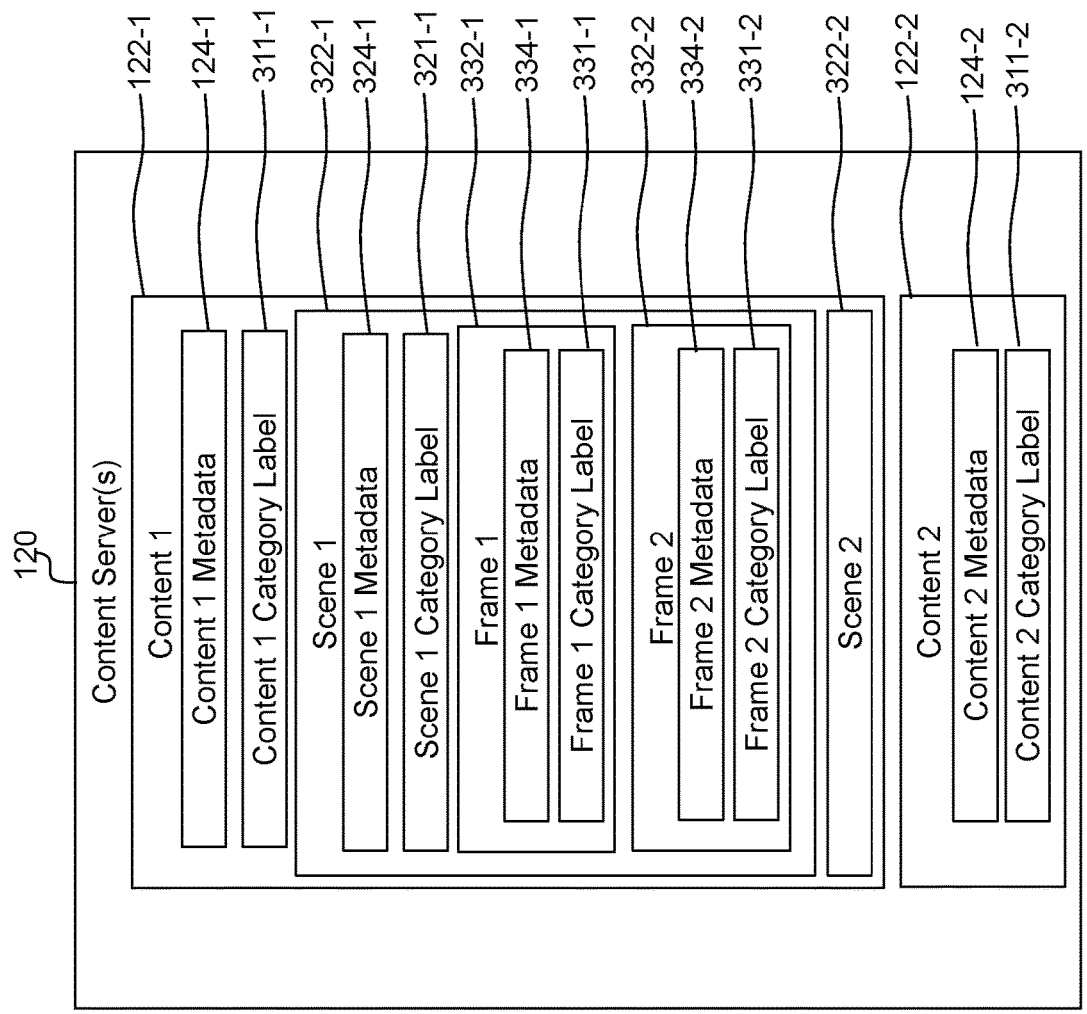
FIG. 3 illustrates a block diagram of a content server having category labels for a content, according to some embodiments.

FIG. 3 illustrates a block diagram of content server(s) 120 storing category labels for content, according to some embodiments. As shown in FIG. 3, content server(s) 120 can include a plurality of content items, such as content 122-1 and content 122-2. Content 122-2 can have a similar structure as content 122-1. Though FIG. 3 illustrates two content items in content server(s) 120, content server(s) 120 can include more than two content items having a similar structure as content 122-1. The discussion of elements of content 122-1 applies to content 122-2, unless mentioned otherwise. And like reference numerals generally indicate identical, functionally similar, and/or structurally similar elements.

In some embodiments, as shown in FIG. 3, content 122-1 can include content metadata 124-1 and content category label 311-1. Similarly, content 122-1 can include content metadata 124-2 and content category label 311-2. In some embodiments, content 122-1 can include a plurality of scenes, such as scene 322-1 and scene 322-2. Content 122-2 can have a similar structure as content 122-1. In some embodiments, each scene can include a plurality of frames. As an example, scene 322-1 can include scene metadata 324-1, scene category label 331-1, frame 332-1, and frame 332-2. Scene 322-2 can have a similar structure as scene 322-1. Frame 332-1 can further include frame metadata 334-1 and frame category label 331-1. Similarly, frame 332-2 can further include frame metadata 334-2 and frame category label 331-2.

In some embodiments, frame metadata 334-1 and 334-2, scene metadata 324-1, and content metadata 124-1 and 124-2 may include associated or ancillary information similar to content metadata 124-1 and 124-2 as described above. In some embodiments, the associated and ancillary information can be generated by the content creators or by content server(s) 120. In some embodiments, frame metadata 334-1 and 334-2 may include color contrast, brightness, histogram of color spectrum, a number of objects, a trajectory of objects contained in frames 332-1 and 332-2, or a frame feature contained in frames 332-1 and 332-2. Scene metadata 324-1 related to scene 322-1 may include information about objects, people, places, actions, caption data text of scene 322-1, and audio information related to scene 322-1. In some embodiments, Content metadata 124-1 and 124-2 related to respective content 122-1 and 122-2 can include information about respective genre of the content, keywords, a description, and reviews of content 122-1 and 122-2.

Category labels 311-1 and 311-2 can indicate inappropriateness of respective content 122-1 and 122-2 for certain audiences (e.g., children). In some embodiments, category labels 311-1 and 311-2 can include respective rating of content 122-1 and 122-2, such as PG, PG-13, and R, as well as other labels about content 122-1 and 122-2, such as violence, nudity, inappropriate language, and other inappropriate materials. In some embodiments, category labels 311-1 and 311-2 can be provided by the content provider and can be included in respective content 122-1 and 124-1. In some embodiments, category labels 311-1 and 311-2 can be collected from user's report or feedback and included in respective content 122-1 and 124-1. In some embodiments, one or more labelers can view content 122-1 and 122-2 and label content 122-1 and 122-2 with respective category labels 311-1 and 311-2.

Similar to content category labels 311-1 and 311-2, scene category label 321-1, and frame category labels 331-1 and 331-2 can indicate inappropriateness of respective scene 322-1 and frames 332-1 and 332-2 for certain audiences (e.g., children). In some embodiments, scene category label 321-1 and frame category labels 331-1 and 331-2 can include similar labels as content category labels 311-1 and 311-2.

Figure 4:
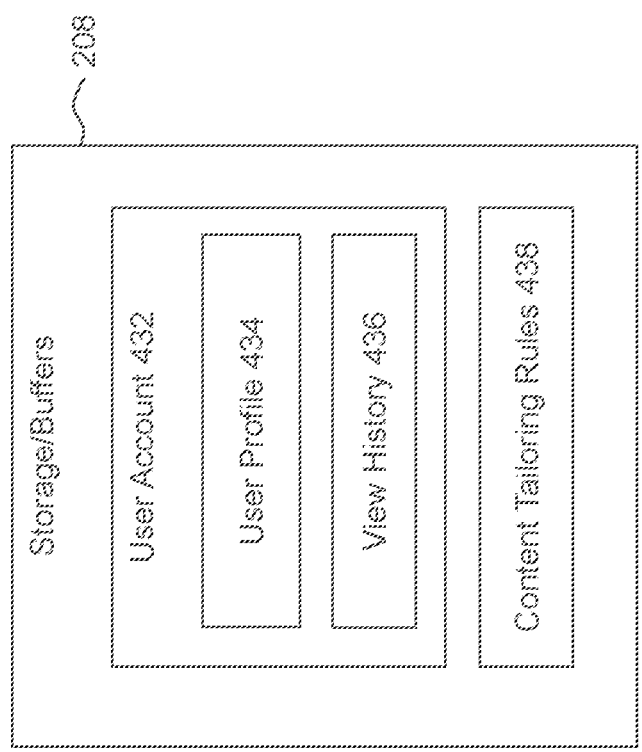
FIG. 4 illustrates a storage module that stores information relating to user accounts and content tailoring rules, according to some embodiments.

FIG. 4 illustrates storage/buffers 208 that stores information relating to user accounts and content tailoring rules, according to some embodiments. As shown in FIG. 4, storage/buffers 208 can include one or more content tailoring rules 438 and one or more user accounts, such as user account 432. User account 432 may be shared and accessible among multiple users, such as one or more members of a household. User account 432 can further include user profile 434 and view history 436. User profile 434 may be related to all the members of the household. In some embodiments, user profile 434 can include respective user preferences for each member of the household associated with user account 432. User profile 434 can be related to and store information about user settings of media systems 104 and media content by user(s) 132 accessed through user account 432. For example, user profile 434 may include user preferred image properties and sound effects, user's favorite genres, and other user requirements and settings. Additionally, user profile 434 can include one or more images and/or one or more audio recordings of user(s) 132 for user identification. In some embodiments, user profile 434 can include a category for each of user(s) 132. The category of user(s) 132 can include adults, men, women, children under seventeen, children under thirteen, toddlers, a member of household, guests, and other categories. For example, user(s) 132 may be a child, a parent, or a guest. In some embodiments, user profile 434 may further include demographic information of user(s) 132 and other information related to user(s) 132.

View history 436 can include information related to media content viewed by user(s) 132, for example, the name of a show user(s) 132 viewed, a time user(s) 132 viewed the show, a frame user stopped viewing, and other related information. In some embodiments, view history 436 can include a portion of content 122 being viewed by user(s) 132.

Content tailoring rules 438 can include rules to modify content to be played on display device(s) 108. In some embodiments, content tailoring rules 438 can include rules that can tailor and censor content 122. After being tailored, content 122 can be appropriate for playback on display device(s) 108. For example, content 122-1 may include some scenes, such as scene 322-1 inappropriate for children. Scene category label 321-1 may indicate scene 322-1 includes one or more frames related to violence, crime, nudity, or other materials inappropriate for children. The inappropriate frames can be identified by frame category labels 311-1 or 311-2. Content tailoring rules 438 can be used to skip inappropriate frames, scenes, or content to generate tailored content 122 for playback on display device(s) 108. In some embodiments, content tailoring rules 438 can be associated to respective user profile 434. For example, content tailoring rules 438 to skip inappropriate content for children can be associated to user profile 434 of a child.

Content Tailoring Based on Audience Detected

FIG. 5 illustrates a block diagram of a system 500 for identifying user(s) 132 in an audience and tailoring and censoring content for detected user(s) 132, according to some embodiments. As shown in FIG. 5, system 500 can include media device(s) 106, speech recognition system 554, natural language understanding system 556, and content server(s) 120. In some embodiments, system 500 can further include display device(s) 108, remote control 110, and/or system server(s) 126 shown in FIG. 1. Media device(s) 106 can further include user identification system 546, content tailoring system 548, and search engine 552. Sensing module(s) 218 can further include image sensing module 542 and audio sensing module 544.

Image sensing module 542 can include cameras, infra-red sensors, or other image sensors to detect audiences, such as user A and user B in FIG. 5, within a vicinity of image sensing module 542. Image sensing module 542 can capture one or more images of the detected users in the audience for identification. In some embodiments, image sensing module 542 can include cameras in display device(s) 108 and/or cameras in any devices used by user(s) 132 (e.g., a mobile phone with an application to interact with media systems 104). Similarly, audio sensing module 544 can include microphones or other audio sensors to detect audiences, such as user A and user B in FIG. 5, within a vicinity of audio sensing module 544. In some embodiments, audio sensing module 544 can include microphone 112 in remote control 110, microphones in display device(s) 108, and/or microphones in any devices used by user(s) 132 to interact with media systems 104. Audio sensing module 544 can capture one or more utterances of the detected users in the audience for identification. In some embodiments, while display device(s) 108 are playing back content 122 received from content server(s) 120, image sensing module 542 and audio sensing module 544 may continuously or periodically "watching" for objects and "listening" for voices within the vicinity of media device(s) 106 in order to detect any audiences within the vicinity. In some embodiments, utterance and voice are used interchangeably in the current description to indicate the sound uttered by users within the vicinity.

In some embodiments, one or more user(s) 132, which may include users A and B, have corresponding user account 432 stored in storage/buffers 208. For example, users A and B can be one or more members of a household. In some embodiments, users A and B may have no user account 432 and may not be able to control media device(s) 106. For example, users A and B can be a child of the household that has no user account 432 and no control of media device(s) 106, or the child of the household may have a child account that is controlled by the parent in the household. In another example, users A and B may be guests of one or more members of the household. Users A and B may be guest children or adults and may have no corresponding user account 432. Though FIG. 5 illustrates two users A and B within the vicinity of media device 106, one or more users may be within the vicinity of media device 106.

User identification system 546 can identify detected audiences within a vicinity of media device 106, such as user A and user B. User identification system 546 may continuously or periodically monitor the identifying information, such as the images and utterances, captured by image and audio sensing modules 542 and 544. In some embodiments, user identification system 546 can identify user A and user B based on one or more images captured by image sensing module 542. In some embodiments, user identification system 546 can include a machine-learning model trained with the images in user profile 434 stored in storage/buffers 208. In some embodiments, the machine-learning model can be trained with one or more image databases. The image databases may include user figure images labeled with categories. The machine-learning model can identify user figures in the figure images and associate the user figures with the categories. As a result, user identification system 546 can determine the categories for the captured images using the machine-learning model.

In some embodiments, if user A and user B have corresponding user account 432 with stored images, user identification system 546 can identify user A and user B based on the stored images in user profile 434. With identified user profile 434, user identification system 546 can further determine the category of user A and user B. In some embodiments, if user A and user B have no user account 432 or user account 432 and has no stored images of user A and user B, user identification system 546 can compare the captured images with images in the image databases and determine the category for captured images using the machine-learning model.

In some embodiments, user identification system 546 can identify user A and user B based on one or more utterances captured by audio sensing module 544. In some embodiments, user identification system 546 can include a machine-learning model trained with the visual images or audio recordings in user profile 434 stored in storage/buffers 208. In some embodiments, the machine-learning model can be trained with one or more visual image databases and/or one or more audio recording databases. The visual image databases may include visual images with identified categories. The audio recording databases may include user utterance with identified categories. The machine-learning model can identity user images in images and/or sound tracks in the audio recordings and associate the user images and/or sound tracks with the categories. As a result, user identification system 546 can determine the category of user A and user B using the machine-learning model.

In some embodiments, if user A and user B have corresponding user account 432 with stored image and/or audio recordings, user identification system 546 can identify user A and user B based on the stored images and/or audio recordings in user profile 434. With identified user profile 434, user identification system 546 can further determine the category of user A and user B. In some embodiments, if user A and user B have no user account 432 or user account 432 and has no stored images and/or audio recordings of user A and user B, user identification system 546 can compare the captured images and/or audio recordings with images in the image databases and audio recordings in the audio recording databases, respectively, and determine the categories of user A and user B using the machine-learning model.

In some embodiments, user identification system 546 can identify user A and user B and determine respective categories based on both the images and the utterances captured by image and audio sensing modules 542 and 544. In some embodiments, with both captured images and captures utterances, user identification system 546 can have improved accuracy in identifying detected audiences. For example, if a child is outside the room in which media device(s) 106 and display device(s) 108 are playing a content, a voice of the child may be captured by audio sensing module 544 while image sensing module 542 may not capture an image of the child. User identification system 546 can use both the captured images and utterances to determine that the child is not within the vicinity of media device(s) 106 and display device(s) 108.

In some embodiments, sensing module(s) 218 can include additional sensing modules, such as infra-red sensors and touch sensors. Unser identification system 546 can use one or more captured identifying information from sensing module(s) 218. Each of the sensing modules in sensing module(s) 218 may continuously or periodically work to detect any users within the vicinity of media device(s) 106 and display device(s) 108. In some embodiments, the sensing modules may continuously or periodically work when display device(s) 108 are currently playing content.

Content tailoring system 548 can modify content to be played on display device(s) 108 based on the category of detected audience and corresponding content tailoring rules 438 for the detected audience. In some embodiments, content tailoring system 548 may modify the content dynamically as the content is being streamed to media device(s) 106. For example, scenes or frames may be dynamically skipped based on users detected within vicinity of media device(s) 106. In some embodiments, content tailoring system 548 may determine that a modification is needed when the content is initially selected and may subsequently update the determination as the content is being played as the number of users in the audience is detected while the content is being played (streamed). In some embodiments, content tailoring system 548 may determine that a prior modification is not needed when the users in the audience change. For example, if a previously-detected children leave the room or the vicinity of media device(s) 106, content tailoring system 548 may update the content tailoring rule for the detected audience and the original content may be played.

In some embodiments, content tailoring system 548 can receive the determined category of the detected audience from user identification system 546. Content tailoring system 548 can identify corresponding rules in content tailoring rules 438 for the determined category. For example, content tailoring rules 438 for a child under thirteen may specify skipping inappropriate content that includes violence, crime, nudity, and inappropriate language. With identified content tailoring rules 438, content tailoring system 548 can modify content 122-1 and 122-2 to be displayed on display device(s) 108 based on respective category labels. In some embodiments, content tailoring system 548 can skip upcoming frames having frame category labels inappropriate for the determined category. In some embodiments, content tailoring system 548 can skip all frames in upcoming scenes having scene category labels inappropriate for the determined category. In some embodiments, if scene 322-1 includes less than a threshold percentage of frames having inappropriate category labels, for example, less than about 1%, content tailoring system 548 may not need to skip all the frames in scene 322-1. Content tailoring system 548 may just skip frames with inappropriate frames category labels in scene 322-1.

In some embodiments, user identification system 546 may detect multiple users, such as user A and user B in FIG. 5. In some embodiments, this detection may occur at any time, including at the time that content is selected and while the content is being streamed. With multiple categories determined for the multiple users, content tailoring system 548 may identify multiple content tailoring rules for the multiple users and perform a union, intersection, or other combination or delineation of the multiple content tailoring rules to update the content tailoring rules and modify the content with the updated content tailoring rules. For examples, if user identification system 546 identifies a child and a parent, content tailoring system 548 may perform an intersection of the content tailoring rules and tailor the content based on the rule appropriate for children. In some embodiments, each of the multiple categories can have a priority. Content tailoring system 548 can identify a content tailoring rule for the category having the highest priority. For example, a category of children can have a higher priority than a category of adult. In another example, if user identification system 546 identifies a parent without any children, content tailoring system 548 may tailor the content based on the rule appropriate for the parent. When a child enters within the vicinity of media device(s) 106 and display device(s) 108 while the parent is playing content 122-1 on display device(s) 108, user identification system 546 may identify the child with sensing module(s) 218. Accordingly, content tailoring system 548 can tailor the content based on the newly detected child, by, for example, skipping upcoming frames or scenes based on the rule appropriate for children.

Search engine 552 can search for appropriate content based on identified content tailoring rules 438 and user preferences in user profile 434. In some embodiments, in response to an instruction from the detected user(s) 132, search engine 552 can search for content tailored and censored for the detected audience. In some embodiments, user identification system 546 may detect multiple user(s) 132. Content tailoring system 548 may identify multiple content tailoring rules for the multiple user(s) 132 and perform a union, intersection, or other combination or delineation of the multiple content tailoring rules and the user preferences of the multiple user(s) 132 in the detected audience. Search engine 552 can search for content based on updated content tailoring rules and user preferences.

In some embodiments, speech recognition system 554 can recognize the speech in the one or more utterances captured by audio sensing module 544 and convert the speech into text. In some embodiments, media device(s) 106 can communicate with speech recognition system 554 and receive the text for the one or more utterances capture by audio sensing module 544. In some embodiments, speech recognition system 554 can be included in media device(s) 106 or media systems 104 to recognize the speech in the captured utterances. In some embodiments, speech recognition system 554 can be included in system server(s) 126, such as audio command processing module 130, to communicate with media device(s) 106. In some embodiments, speech recognition system 554 can be a third party system communicating with media device(s) 106.

In some embodiments, user identification system 546 can identify detected audiences based on the captured one or more utterances and stored audio recordings in user account 432. In some embodiments, natural language understanding system 556 can determine an intent for the captured one or more utterances based on the converted text and user profile 434 for identified audiences. In some embodiments, natural language understanding system 556 can be included in media device(s) 106 or media systems 104 to determine the intent for the captured utterances. In some embodiments, natural language understanding system 556 can be included in system server(s) 126, such as audio command processing module 130, to communicate with media device(s) 106. In some embodiments, natural language understanding system 556 can be a third party system communicating with media device(s) 106. In some embodiments, user identification system 546 may obtain demographic information of the detected audiences with graph-based inference. The demographic information can be stored in user profile 434 and used for tailoring content by content tailoring system 548. In some embodiments, media device(s) 106 can communicate with natural language understanding system 556 and receive the intent for the captured one or more utterances. In some embodiments, search engine 552 can use the determined intent and identified user profile 434 to search for content in response to the captured one or more utterances.

Figure 6:
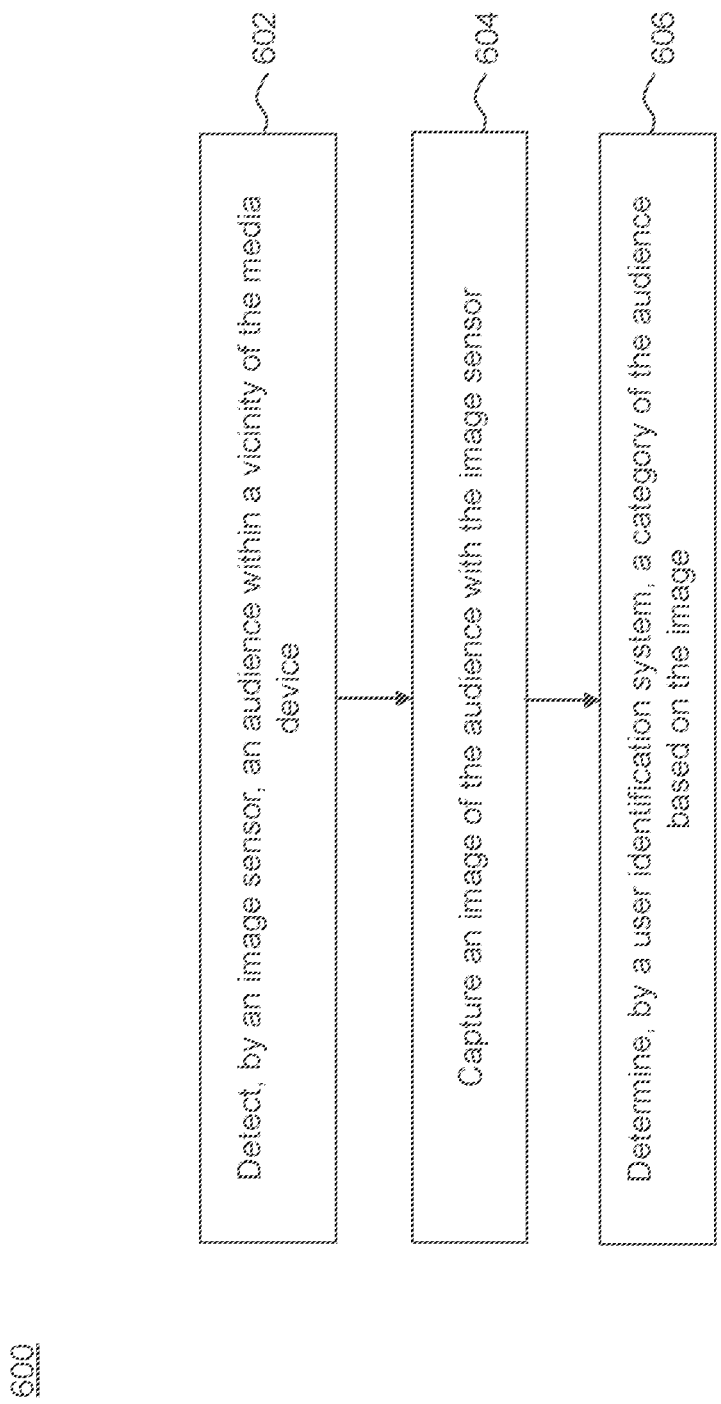
FIG. 6 is a flowchart illustrating a method for determining a category of an audience based on captured image information, according to some embodiments.

FIG. 6 is a flowchart illustrating a method 600 for determining a category of an audience based on captured image information, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 600 shall be described with reference to FIG. 5. However, method 600 is not limited to that example embodiment. FIGS. 1-4 illustrate more details of method 600 during the process of determining the category of the audience.

Referring to FIG. 6, in step 602, an audience within a vicinity of a media device is detected by an image sensor. For example, as shown in FIG. 5, image sensing module 542 can detect user A and user B within the vicinity of media device 106. In some embodiments, image sensing module 542 can include cameras, infra-red sensors, or other image sensors to detect users A and B. In some embodiments, image sensing module 542 can continuously or periodically "watching" for objects within the vicinity of media device(s) 106 in order to detect any audiences within the vicinity. In some embodiments, image sensing module 542 may be activated only when content is being played by media device(s) 106 and deactivated when content is not being played in order to ensure privacy for users of media device(s) 106.

In step 604, an image of the audience is captured with the image sensor. For example, as shown in FIG. 5, one or more images of users A and B can be captured with image sensing module 542. In some embodiments, the captured one or more images can be stored in storage/buffers 208. In some embodiments, the one or more images can be sent to user identification system 546 for audience identification.

In step 606, a category of the audience is determined by a user identification system based on the image. For example, as shown in FIG. 5, user identification system 546 can determine the categories of users A and B based on the captured one or more images. In some embodiments, if users A and B include one or more user(s) 132 having corresponding user account 432 with stored images of users A and B, user identification system 546 can identify users A and B with a machine-learning method by comparing the captured one or more images with the stored images in user account 432. Accordingly, user identification system 546 can determine categories of users A and B based on user profile 434 in user account 432. In some embodiments, if users A and B have no stored images in user account 432 or users A and B have no user account, user identification system 546 can use the machine-learning model to compare the captured one or more images with images in image databases and determine the categories of users A and B.

Figure 7:
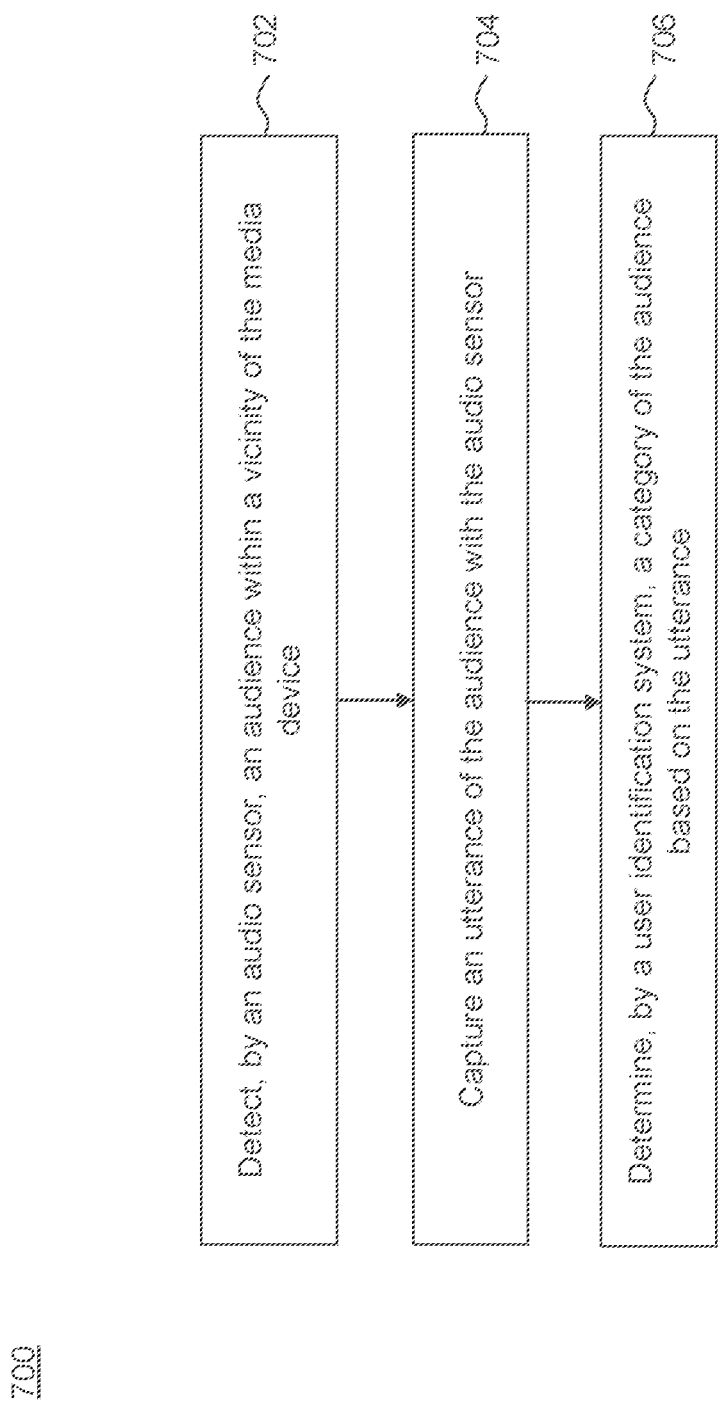
FIG. 7 is a flowchart illustrating a method for determining a category of an audience based on captured audio information, according to some embodiments.

FIG. 7 is a flowchart illustrating a method 700 for determining a category of one or more users in an audience based on captured audio information, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. Method 700 shall be described with reference to FIG. 5. However, method 700 is not limited to that example embodiment.

FIGS. 1-4 illustrate more details of method 700 during the process of determining the category of the audience.

Referring to FIG. 7, in step 702, an audience comprising one or more users within a vicinity of a media device is detected by an audio sensor. For example, as shown in FIG. 5, audio sensing module 544 can detect user A and user B within the vicinity of media device 106. In some embodiments, audio sensing module 544 can include microphones or other audio sensors to detect users A and B. In some embodiments, audio sensing module 544 can continuously or periodically "listening" for voices within the vicinity of media device(s) 106 in order to detect any audiences within the vicinity while content is being played. In some embodiments, audio sensing module 544 may be activated only when content is being played by media device(s) 106 and deactivated when content is not being played in order to ensure privacy for users of media device(s) 106.

In step 704, an utterance of the audience is captured with the audio sensor. For example, as shown in FIG. 5, one or more utterances of users A and B can be captured with audio sensing module 544. In some embodiments, the captured one or more utterances can be stored in storage/buffers 208. In some embodiments, the one or more utterances can be sent to user identification system 546 for audience identification.

In step 706, a category of the audience is determined by a user identification system based on the utterance. For example, as shown in FIG. 5, user identification system 546 can determine the categories of users A and B based on the captured one or more utterances. In some embodiments, if users A and B include one or more user(s) 132 having corresponding user account 432 with stored audio recordings of users A and B, user identification system 546 can identify users A and B with a machine-learning method by comparing the captured one or more utterances with the stored audio recordings in user account 432. Accordingly, user identification system 546 can determine categories of users A and B based on user profile 434 in user account 432. In some embodiments, if users A and B have no stored audio recordings in user account 432 or users A and B have no user account 432, user identification system 546 can use the machine-learning model to compare the captured one or more utterances with audio recordings in audio recording databases and determine the categories of users A and B.

Figure 8:
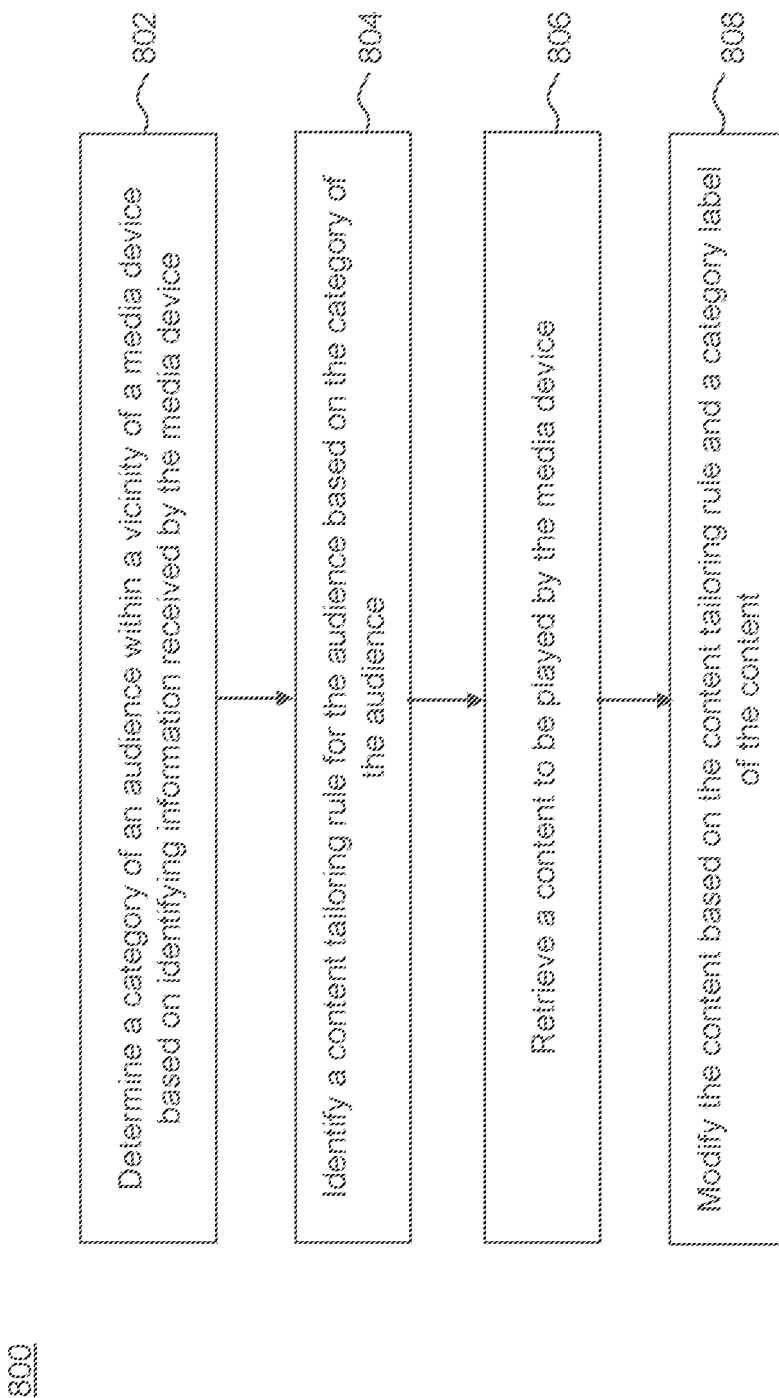
FIG. 8 is a flowchart illustrating a method for tailoring content based on detected audience, according to some embodiments.

FIG. 8 is a flowchart illustrating a method 800 for tailoring content based on detected audiences, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art. Method 800 shall be described with reference to FIG. 5. However, method 800 is not limited to that example embodiment. FIGS. 1-4 illustrate more details of method 800 during the process of tailoring content based on audiences.

Referring to FIG. 8, in step 802, a category of an audience within a vicinity of a media device is determined based on identifying information received by the media device. For example, as shown in FIG. 5, user identification system 546 can determine categories of users A and B within a vicinity of media device(s) 106 based on identifying information received by media device(s) 106. In some embodiments, the identifying information can include one or more images of users A and B captured by image sensing module 542. The process of determining the categories of users A and B based on captured images can be illustrated by method 600 in FIG. 6. In some embodiments, the identifying information can include one or more utterances of users A and B captured by audio sensing module 544. The process of determining the categories of users A and B based on captured utterances can be illustrated by method 700 in FIG. 7.

In step 804, a content tailoring rule for the audience is identified based on the category of the audience. For example, as shown in FIG. 5, content tailoring system 548 can identify a content tailoring rule in content tailoring rules 438 based on the determined categories of users A and B. In some embodiments, if a single category is determined for users A and B, content tailoring system 548 can identify the corresponding content tailoring rule. In some embodiments, if multiple categories are determined for users A and B, content tailoring system 548 may identify multiple content tailoring rules for the users A and B and perform a union, intersection, or other combination or delineation of the multiple content tailoring rules. In some embodiments, each of the multiple categories can have a priority. Content tailoring system 548 can identify a content tailoring rule for the category having the highest priority. For example, a category of children can have a higher priority than a category of adult.

In step 806, a content to be played by the media device is retrieved. For example, as shown in FIG. 5, media device(s) 106 can retrieve a content from content server(s) 120 to be played on display device(s) 108. In some embodiments, the content to be played on display device(s) 108 can be upcoming frames and scenes of the content currently playing on display device(s) 108. In some embodiments, as shown in FIG. 3, the content to be played on display device(s) 108 can include content 122-1 having content metadata 124-1 and content category label 311-1. Content 122-1 can include scene 322-1 having scene metadata 324-1 and scene category label 321-1. Scene 322-1 can further include frame 1 having frame metadata 334-1 and frame category label 331-1.

In step 808, the content is modified based on the content tailoring rule and a category label of the content. For example, as shown in FIG. 5, content tailoring system 548 can modify the content based on the identified content tailoring rule and a category label of content 122-1 in content server(s) 120 to be played by media device(s) 106. In some embodiments, if scene category label 311-1 of scene 322-1 is inappropriate for the identified content tailoring rule and scene 322-1 includes more than a threshold percentage of frames having inappropriate category labels, content tailoring system 548 can skip scene 322-1. In some embodiments, if scene category label 311-1 of scene 322-1 is inappropriate for the identified content tailoring rule while scene 322-1 includes less than a threshold percentage of frames having inappropriate category labels, content tailoring system 548 can play scene 322-1 but skip the frames having category labels inappropriate according to the identified content tailoring rule.

Content tailoring system 548 may modify content at different time periods, such as when content is initially selected and/or while the content is being played. In some embodiments, content tailoring system 548 may determine whether content needs to be modified upon the content being selected by detecting the users in the vicinity of media device(s) 106. In some embodiments, content tailoring system 548 may determine whether content needs to be modified while content is being played, such as when new users are detected in the vicinity of media device(s) 106 and/or when previously detected users are no longer in the vicinity of media device(s) 106. For example, a child may have been previously detected in the audience while content is initially selected but then, while the content is being played (e.g., in the middle of the content), the child may then leave the room and no longer be detected. Content tailoring system 548 may therefore initially determine that content needs to be modified but then subsequently determine that the modification to the content is no longer needed since the child is no longer present in the room.

In some embodiments, content tailoring system 548 can modify one or more image properties and/or one or more sound properties of the content based on identified content tailoring rule and user preferences in user profile 434. For example, content tailoring system 548 can modify the content to have specific image properties such as contrast and saturation, and sound properties such as sound effects and volume.

Figure 9:
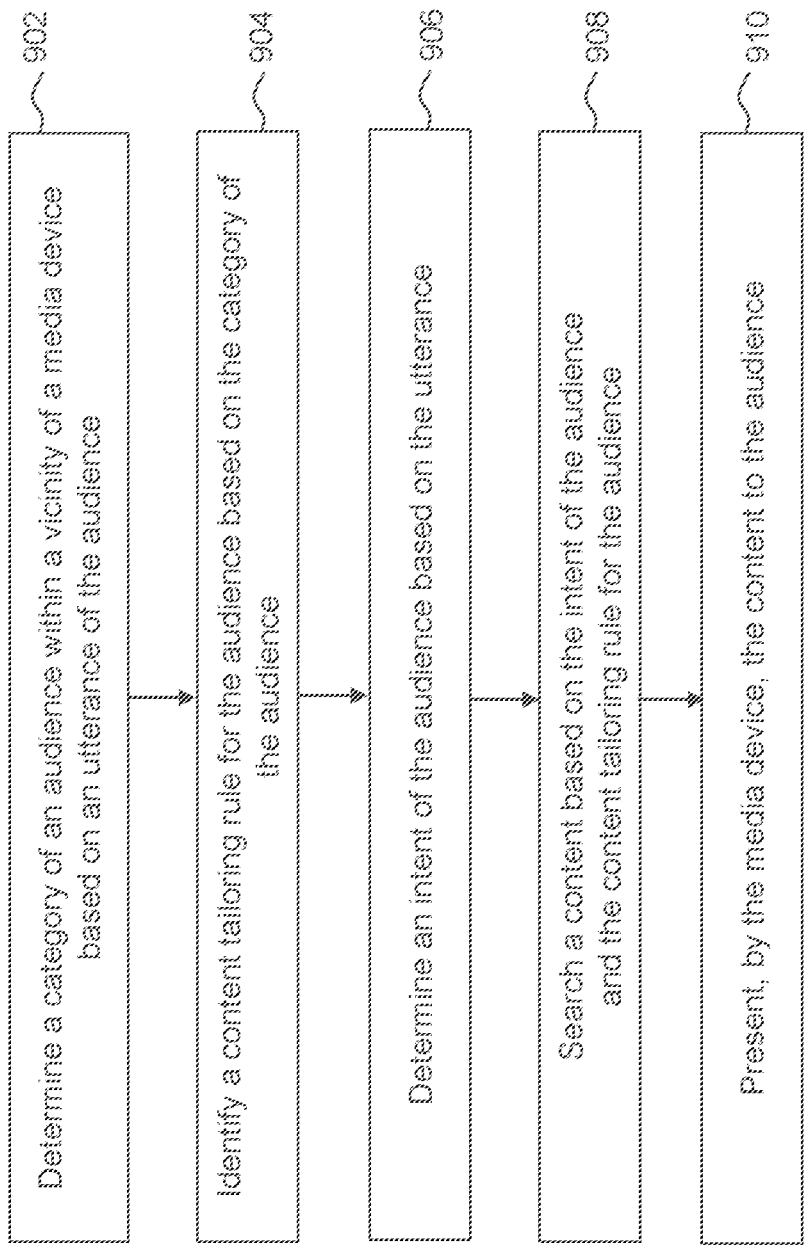
FIG. 9 is a flowchart illustrating a method for playing back content based on detected audience, according to some embodiments.

FIG. 9 is a flowchart illustrating a method 900 for playing back content based on detected audiences, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art. Method 900 shall be described with reference to FIG. 5. However, method 900 is not limited to that example embodiment. FIGS. 1-4 illustrate more details of method 900 during the process of tailoring content based on audiences.

Referring to FIG. 9, in step 902, a category of an audience within a vicinity of a media device is determine based on an utterance of the audience. For example, as shown in FIG. 5, user identification system 546 can determine categories of users A and B within a vicinity of media device(s) 106 based on one or more utterances from users A and B. In some embodiments, the one or more utterances of users A and B can be captured by audio sensing module 544. User identification system 546 can identify users A and B and determine categories for users A and B. In some embodiments, the process of determining the categories of users A and B based on captured utterances can be illustrated by method 700 in FIG. 7. In some embodiments, the one or more utterances can include an instruction for media device(s) 106 to play a specific content item, such as "play an action movie" or "continue playing."

In step 904, a content tailoring rule for the audience is identified based on the category of the audience. For example, as shown in FIG. 5, content tailoring system 548 can identify a content tailoring rule in content tailoring rules 438 based on the determined categories of users A and B. In some embodiments, the process of identifying the content tailoring rule can be similar to step 804 in method 800 as shown in FIG. 8.

In step 906, an intent of the audience is determined based on the utterance. For example, as shown in FIG. 5, natural language understanding system 556 can determine the intent of the captured one or more utterances from users A and B. In some embodiments, natural language understanding system 556 can determine the intent based on user profile 434 for identified audiences and the text of the one or more utterances converted by speech recognition system 554.

In step 908, a content is searched based on the intent of the audience and the content tailoring rule for the audience. For example, as shown in FIG. 5, search engine 552 can search for the content based on the intent determined by natural language understanding system 556 and the content tailoring rule for users A and B identified by content tailoring system 548. In some embodiments, in response to an instruction of the captured utterances to play a specific item, search engine 552 can search for related content items for users A and B according to the identified content tailoring rule and user preferences in user profile 434. In some embodiments, in response to an instruction of the captured utterances to continue playing, search engine 552 can search for prior content items for user A or B according to the identified content tailoring rule and view history 436 in user account 432. In some embodiments, search engine 552 can obtain the searched content from content server(s) 120, with each content item having content category labels such as category label 311-1, scene category labels such as category label 321-1, and frame category labels such as category labels 331-1 and 331-2.

In step 910, the content is presented by the media device to the audience. For example, as shown in FIG. 5, the content obtained by search engine 552 can be presented to users A and B by media device(s) 106. In some embodiments, the obtained content can have content, scene, and frame category labels and can be tailored and censored by content tailoring system 548 while the obtained content is playing on display device(s) 108.

Example Computer System

Figure 10:
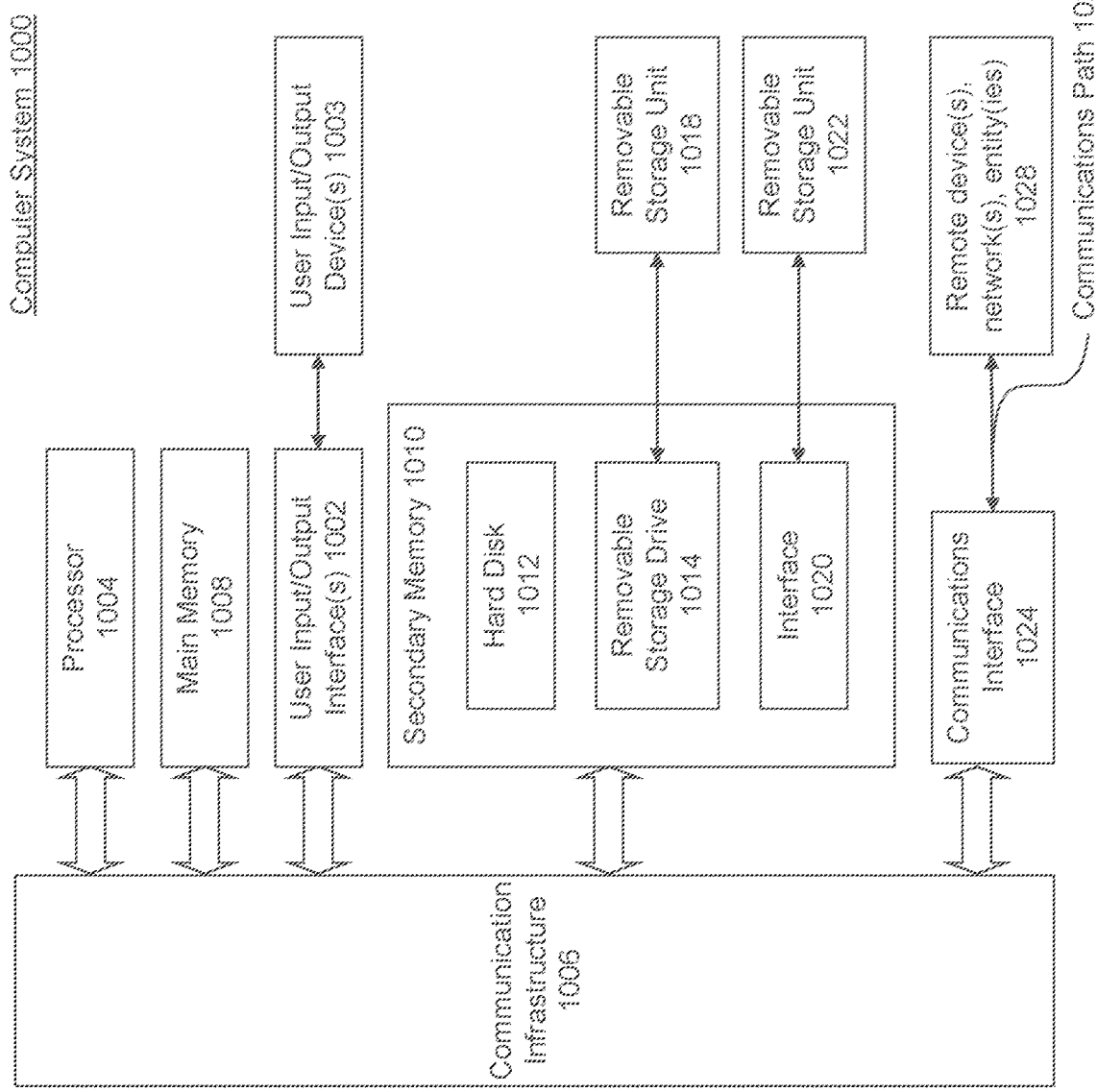
FIG. 10 illustrates an example computer system useful for implementing various embodiments.

Various embodiments may be implemented, for example, using one or more well-known computer systems, such as computer system 1000 shown in FIG. 10. For example, the media device 106 may be implemented using combinations or sub-combinations of computer system 1000. Also or alternatively, one or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014.

Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

Conclusion

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system, comprising:
a storage module; and
at least one processor each coupled to the storage module and configured to:
retrieve a content to be played by a media device, wherein the content comprises a plurality of frames and each frame of the plurality of frames comprises a category label;
detect an audience within a vicinity of the media device based on identifying information received by the media device;
determine a plurality of categories of the audience with a user identification system based on the identifying information, wherein each of the plurality of categories has a priority;
determine a category having a highest priority in the plurality of categories;
identify a content tailoring rule for the audience based on the category having the highest priority in the plurality of categories of the audience, wherein the content tailoring rule includes a modification of the plurality of frames in the content; and
modify, while the content is being played by the media device, the plurality of frames of the content based on the content tailoring rule and a threshold percentage of frames having inappropriate category labels in a scene of the content.

2. The system of claim 1, wherein the identifying information includes at least one image of the audience captured by an image sensor.

3. The system of claim 2, wherein to determine the plurality of categories of the audience with the user identification system, the at least one processor is configured to determine the plurality of categories of the audience based on the at least one image captured by the image sensor.

4. The system of claim 1, wherein the identifying information includes at least one utterance of the audience captured by an audio sensor in the media device.

5. The system of claim 4, wherein to determine the plurality of categories of the audience with the user identification system, the at least one processor is configured to determine the plurality of categories of the audience based on the at least one utterance.

6. The system of claim 4, wherein to retrieve the content to be played by the media device, the at least one processor is configured to:
receive an intent of the audience based on the at least one utterance, wherein the intent of the audience is determined by a natural language understanding system; and
search the content based on the intent of the audience and the content tailoring rule for the audience.

7. The system of claim 1, wherein to modify the plurality of frames of the content, the at least one processor is configured to skip one or more frames in the content scene in response to a percentage of the one or more frames having the inappropriate category labels in the scene being less than the threshold percentage.

8. The system of claim 1, wherein the at least one processor is further configured to:
change an image property of the content based on the content tailoring rule of the audience; and
change a sound property of the content based on the content tailoring rule of the audience.

9. The system of claim 1, wherein to retrieve the content to be played by the media device, the at least one processor is configured to retrieve one or more upcoming frames of the content being played by the media device.

10. The system of claim 1, wherein the at least one processor is further configured to:
receive an instruction of continuing watching from the audience;
identify a view history of the audience; and
retrieve one or more upcoming frames of a prior content viewed by the audience based on the instruction and the view history.

11. The system of claim 1, wherein the audience comprises one or more users of the media device and the at least one processor is further configured to:
identify one or more user accounts for the one or more users based on the identifying information; and
identify the plurality of categories based on user profiles in the one or more user accounts.

12. A computer-implemented method, comprising:
retrieving a content to be played by a media device, wherein the content comprises a plurality of frames and each frame of the plurality of frames comprises a category label;
detecting, by at least one computer processor, an audience within a vicinity of the media device based on identifying information received by the media device;
determining a plurality of categories of the audience with a user identification system based on the identifying information, wherein each of the plurality of categories has a priority;
determining a highest priority in the plurality of categories;
identifying a content tailoring rule for the audience based on a category having the highest priority in the plurality of categories of the audience, wherein the content tailoring rule includes a modification of the plurality of frames in the content; and
modifying, while the content is being played by the media device, the plurality of frames of the content based on the content tailoring rule and a threshold percentage of frames having inappropriate category labels in a scene of the content.

13. The computer-implemented method of claim 12, wherein the identifying information includes at least one image of the audience captured by an image sensor.

14. The computer-implemented method of claim 13, wherein determining the plurality of categories of the audience with the user identification system comprises determining the plurality of categories of the audience based on the at least one image captured by the image sensor.

15. The computer-implemented method of claim 12, wherein the identifying information includes at least one utterance of the audience captured by an audio sensor.

16. The computer-implemented method of claim 15, wherein determining the plurality of categories of the audience with the user identification system comprises determining the plurality of categories of the audience based on the at least one utterance.

17. The computer-implemented method of claim 15, wherein retrieving the content to be played by the media device comprises:
  receiving an intent of the audience based on the at least one utterance, wherein the intent of the audience is determined by a natural language understanding system; and
  searching the content based on the intent of the audience and the content tailoring rule for the audience.

18. The computer-implemented method of claim 15, wherein modifying the plurality of frames of the content based on the content tailoring rule and the category label of each frame of the plurality of the content comprises skipping the scene in the content in response to a percentage of frames having inappropriate category labels in the scene being greater than the threshold percentage.

19. A non-transitory computer-readable medium having instructions stored thereon that, when executed by at least one computing device, cause the at least one computing device to perform operations comprising:
  retrieving a content to be played by a media device, wherein the content comprises a plurality of frames and each frame of the plurality of frames comprises a category label;
  detecting an audience within a vicinity of the media device based on identifying information received by the media device;
  determining a plurality of categories of the audience with a user identification system based on the identifying information, wherein each of the plurality of categories has a priority;
  determine a highest priority in the plurality of categories;
  identifying a content tailoring rule for the audience based on the category having the highest priority in the plurality of categories of the audience, wherein the content tailoring rule includes a modification of the plurality of frames in the content; and
  modifying, while the content is being played by the media device, the plurality of frames of the content based on the content tailoring rule and a threshold percentage of frames having inappropriate category labels in a scene of the content.

20. The non-transitory computer-readable medium of claim 19, wherein modifying the plurality of frames of the content comprises skipping one or more frames in the scene in response to a percentage of the one or more frames having the inappropriate category labels in the scene being less than the threshold percentage.

* * * * *